(12) United States Patent
Wernersson et al.

(10) Patent No.: US 9,862,085 B2
(45) Date of Patent: Jan. 9, 2018

(54) ATTACHMENT ARRANGEMENT (76) Inventors: Håkan Wernersson, Höllviken (SE); Per Hammer, Åhus (SE)

( * ) Notice: Subject to any disclaimer, the term of this patent is extended or adjusted under 35 U.S.C. 154(b) by 883 days.

(21) Appl. No.: 14/116,547

(22) PCT Filed: May 9, 2012
(Under 37 CFR 1.47)

(86) PCT No.: PCT/SE2012/050494
§ 371 (c)(1),
(2), (4) Date: Jun. 6, 2014

(87) PCT Pub. No.: WO2012/154119
PCT Pub. Date: Nov. 15, 2012

(65) Prior Publication Data
US 2014/0305266 A1    Oct. 16, 2014

(30) Foreign Application Priority Data
May 9, 2011  (SE) ........................................ 1150411

(51) Int. Cl.
*B25G 1/10*     (2006.01)
*E04B 9/20*     (2006.01)
(Continued)

(52) U.S. Cl.
CPC .................. *B25G 1/10* (2013.01); *E04B 9/20* (2013.01); *F16B 5/0233* (2013.01);
(Continued)

(58) Field of Classification Search
CPC ........ B25G 1/10; F16B 5/0275; F16B 5/0233; F16B 5/0266; F16B 5/0241; E04B 9/20; E04B 2009/186
See application file for complete search history.

(56) References Cited

U.S. PATENT DOCUMENTS 3,296,048 A * 1/1967 Wolfe ..................... B29C 73/06
                                                         152/370
4,348,141 A * 9/1982 Dahl ......................... F16B 35/04
                                                         29/407.02
(Continued)

FOREIGN PATENT DOCUMENTS

WO        2008115119 A1    9/2008

*Primary Examiner* — Larry E Waggle, Jr.
*Assistant Examiner* — Danny Hong
(74) *Attorney, Agent, or Firm* — Capitol City TechLaw (57) ABSTRACT An attachment arrangement (3, 53, 73, 83, 93) for connection to a first construction (1) and in such a connected state be able to hold a second construction (2) where the arrangement has an axial longitudinal extension and shows a first partial portion (3a, 53a, 73a, 83a, 93a), interactable with the first construction (1), and a second partial portion (3b, 53b, 73b, 83b, 93b), interactable with the second partial portion, said partial portions (3a, 53a, 73a, 83a, 93a, 3b, 53b, 73b, 83b, 93b) being connected to each other only by an action means (4, 54, 74, 84, 94), e.g. a resilient means, to allow said second construction (2) to be held at an adapted distance (D) from said first construction (1), wherein said second partial portion (3b, 53b, 73b, 83b, 93b) is provided with a through hole (6, 56, 76, 86, 96), wherein said partial portion in connection with the hole (6, 56, 76, 86, 96) is provided with a twist grip (25, 525, 77, 87, 97) pivotally orientated or orientable for cooperation with a key grip (26, 78, 88, 98) arranged in said first partial portion (3a, 53a, 73a, 83a, 93a) located in the end of said first partial portion (3a, 53a, 73a, 83a, 93a) facing towards said second partial portion (3b, 53b, 73b, 83b, 93b), and a tool (31) for maneuvering such an arrangement.

18 Claims, 4 Drawing Sheets

(51) Int. Cl.
*F16B 5/02* (2006.01)
*E04B 9/18* (2006.01)

(52) U.S. Cl.
CPC .......... *F16B 5/0241* (2013.01); *F16B 5/0266* (2013.01); *F16B 5/0275* (2013.01); *E04B 2009/186* (2013.01)

(56) References Cited

U.S. PATENT DOCUMENTS

| | | | | |
|---|---|---|---|---|
| 4,416,572 A * | 11/1983 | Black | ................... | F16B 13/061 411/38 |
| 4,854,797 A | 8/1989 | Gourd | | |
| 5,030,052 A * | 7/1991 | Anderson | ............... | F16B 35/00 411/383 |
| 5,061,137 A | 10/1991 | Gourd | | |
| 5,411,523 A * | 5/1995 | Goble | ................. | A61B 17/0401 606/104 |
| 5,584,629 A * | 12/1996 | Bailey | ................. | A61C 8/0022 403/334 |
| 5,735,898 A * | 4/1998 | Brånemark | ......... | A61F 2/30721 606/317 |
| 7,601,171 B2 * | 10/2009 | Ainsworth | ............. | A61B 17/70 623/17.11 |
| 8,114,141 B2 * | 2/2012 | Appenzeller | .......... | A61B 17/68 606/306 |
| 2002/0198527 A1 * | 12/2002 | Muckter | ............ | A61B 17/8685 606/316 |
| 2004/0210227 A1 * | 10/2004 | Trail | .................... | A61B 17/863 606/916 |
| 2005/0113919 A1 * | 5/2005 | Cragg | .................... | A61B 17/70 623/17.11 |
| 2005/0277940 A1 | 12/2005 | Neff | | |
| 2006/0229609 A1 * | 10/2006 | Wang | ................. | A61B 17/7023 606/257 |

* cited by examiner

ATTACHMENT ARRANGEMENT

TECHNICAL FIELD

The present invention generally relates to an attachment arrangement, e.g. a resilient or elastic arrangement, and more specifically to an attachment arrangement to be fastened to a first construction and in such a fastened position be able to hold a second construction.

BACKGROUND OF THE INVENTION

Through the Swedish patent SE 532 372, which corresponds to EP 2 145 057, a similar arrangement is previously known.

This previously known arrangement is to a springy attachment arrangement, adapted to be able to be firmly fastened to a first construction, such as a fixed or bearing construction, such as a frame work, and in such a firmly fastened position be able to hold a second construction, such as a side related and/or subordinated construction, such as a false ceiling built of cross bars and gypsum board, where the arrangement has a first partial portion interactable with the first construction and a second partial portion interactable with the second construction.

The embodiments shown in the document comprise torque transmission connection means between the two partial portions which to a certain degree are sensitive in the transmission between the two portions which may imply difficulties in the transmission of torque between the portions.

PURPOSE OF THE INVENTION

A purpose of the invention is to be able to create conditions in a simple and cost efficient way for further improvements by reducing sound, vibration and/or heat conduction between the first and the second construction, for example between a frame work, as a first construction and a false ceiling or a wall, as a second construction.

Another purpose of the invention is to further decrease the transmission of vibrations from the first to the second construction or vice versa in comparison to existing technique.

Yet another purpose is to provide an arrangement with a more powerful and distinct interference between its parts.

Also, the purpose of the invention is to facilitate the mounting of such an attachment arrangement.

A further purpose with the invention is that the arrangement is so formed that it will be possible to perform the assembly in one working moment, similar to the one for application of an ordinary screw with a screwdriver.

SUMMARY OF THE INVENTION

The arrangement according the invention has a first partial portion interactable with the first construction and a second partial portion interactable with the second construction.

The present invention may be applied as a sound and vibration reduction arrangement between beams of a building and a ceiling, hanging in discrete points, and is based on the assumption that the arrangement shall be resilient/elastic at a sound reducing application, for damping the conduction of the sound waves by vibration movements or by the conduction of the sound waves through sound bridges, by using a thin resilient/elastic means wherein said arrangement shall punctually and well distributed cooperate with the ceiling and its construction The invention, among other things, refers to an attachment arrangement made to be able to be connected to a first construction and in such a connection to be able to hold a second construction. The arrangement has an axial longitudinal extension and shows a first partial portion interactable with the first construction and a second partial portion interactable with the second partial portion. These partial portions are connected to each other only by means of an action means to hold said second construction at an adapted distance from said first construction. The second partial portion is provided with a through hole and has then the shape of a socket or a defined cavity. The partial portion is in connection with the hole or cavity provided with a twist grip pivotally orientated or orientable for cooperation with a key grip arranged in said partial portion, located in the end of said first partial portion facing towards said second partial portion. With this form of arrangement an improved insulation between the two constructions and at the same time a simple mounting of the arrangement are achieved.

The invention is also suitable for heat insulation where e.g. insulation shall be fixed on the inside of an external wall of a façade. The insulation is fixed by means of the arrangement to the inside of the external wall without creating a heat bridge at the fixing device. Since the partial portions of the invention may be manufactured in totally different materials, e.g. the second partial portion may be made in a heat insulating material, alternatively the action means between the two partial portions may be made of a heat insulating material, and then said action means does not have to be resilient.

In yet another embodiment the first partial portion is provided with contact surfaces which bear against the action means so that the first partial portion is resiliently/elastically movable in a longitudinal and/or a lateral direction in relation to the second partial portion.

In yet another embodiment the first partial portion and the second partial portion are cooperated in series with each other by two ends of the action means where the ends are adapted to connect said first and second partial portion to each other.

In yet another embodiment the arrangement is provided with a first thread on its first partial portion to which a first end of the action means is connectable and with a second thread on its second partial portion to which a second end of the action means is connectable wherein only the action means provides a connection between the two partial portions. This embodiment also contributes to reducing the transmission of movements between the two constructions. Also embodiments where the action means is in other ways than by threads connected to the partial portions are possible within the scope of the invention.

In yet another embodiment the action means is shaped as a helical spring with a radius related to a radius of said first and second partial portions. This contributes to a compact shape of the arrangement at suitable applications.

In yet another embodiment said action means is shaped as a resilient/elastic means dimensioned with a spring constant adapted to the actual use and said second partial portion is axially displaceable where there are means for simultaneously rotate both partial portions in a somewhat compressed displace position.

In yet another embodiment the first partial portion is provided with a first fixing means in the shape of a thread for fixing to the first construction.

In yet another embodiment the second partial portion is also provided with a fixing means in the shape of a thread for fixing to the second partial portion. Also this thread may preferably be helix shaped and adapted for gypsum boards or wood.

In yet another embodiment the arrangement is provided with a third thread located on the first partial portion for connecting the arrangement to said first construction by screwing.

In yet another embodiment the first thread and the third thread are axially displaceable in relation to each other along the first partial portion.

In yet another embodiment the third thread is provided with a thread suitable for wood.

In yet another embodiment said first partial portion and said second partial portion are orientated in the extension of each other and the action means is adapted to cooperate with the end portions facing each other of said partial portions, in relation to said extension.

In yet another embodiment the action means in rest position holds the two partial portions separated at a distance δ.

The invention also refers to a tool with a torque connecting end and an arrangement connecting end for adjustment and/or fixing of an arrangement according to anyone of the embodiments mentioned above. The arrangement connecting end of the tool is provided with a twist grip connection formed for engagement with the key grip and with a key grip connection formed for engagement with the key grip whose connections are located at a distance from each other by a grip distance.

In one embodiment of the tool the length of the grip distance corresponds to a length which implies that the two partial portions in the arrangement may be twisted at the same time when the action means of the arrangement is close to or in its rest position.

In one embodiment of the tool the grip distance may be axially displaceable and locked, e.g. with a lock screw, to the tool to change the distance between the twist grip connection and the key grip connection.

Further, the action means may comprise a spring unit dimensioned for a traction force, alternatively a spring unit dimensioned for a compressive force.

Further, a tip for said first partial portion is shown which may be adapted as a drill bit with a diameter slightly less than a slot related diameter of the first thread. The first partial portion may furthermore be provided with a wing with the intention to pre-drill the hole for the second partial portion and which gives space for e.g. a spring to be resilient in. This wing is preferably located after the fixing thread, preferably between the first fixing thread and the first thread. Several wings on the first partial portion are also possible.

Further, the first partial portion may be provided with a shoulder to protect the actions means of the arrangement during use.

Further it is shown that said action means may be formed essentially as a helical spring and with a radius related to or slightly smaller than a radius of said second partial portion.

The concerned constructions are mostly façade constructions of buildings where both sound and heat transmission shall be reduced and constructions within the building where first and foremost the sound and the vibrations have to be reduced. The invention is also suitable for pipe installations in heating, water and sanitary and ventilation applications. An installation of machines where vibrations shall be insulated is also a suitable application for the invention.

The invention comprises different parts which may be of completely different materials depending on its application. For example the second partial portion may be made of a ceramic or a composite material or a material of thermo or thermosetting plastic.

The action means of the invention is not limited to a specific frequency or stiffness range. Neither is the action means limited by having specific heat insulating properties but these may be chosen depending on the actual application. The action means may be of a porous material or have other properties which provide good heat insulation.

The first partial portion, the second partial portion and the action means do not have to be connected into unit by threads of the partial portions. The assembly may also consist of grooved surfaces, conical geometries, glue, soldering, etc.

As mentioned above, a purpose of the invention is that the arrangement is formed so that the assembly shall be able to be performed in one moment similar to a regular screw and a screw driver. This is an important part of the usage of the invention since the fixing movement demands a synchronization of the movements of the included parts. The movement of the parts in the arrangement according to the invention must therewith be synchronized with each other during assembly, which is resolved by an arrangement according to the invention in combination with a tool according to the invention.

BRIEF DESCRIPTION OF THE DRAWINGS

The invention will now be described in the following, references being made to the appended drawings. The drawings only show explanatory sketches with the intention to facilitate the understanding of the invention.

DESCRIPTION OF THE INVENTION

For a proper understanding the invention we have chosen terms and a special terminology for the intention of clarifying the idea of the invention at first hand. It shall, however, be taken into account that the chosen expressions in this context not shall be limited to only the used and chosen terms, but it shall be understood that every thus chosen term shall be so interpreted that in addition it includes all technical equivalents which work in the same or in essentially the same way, so that the same or essentially the same purpose and/or technical effect can be achieved.

Figure 1:
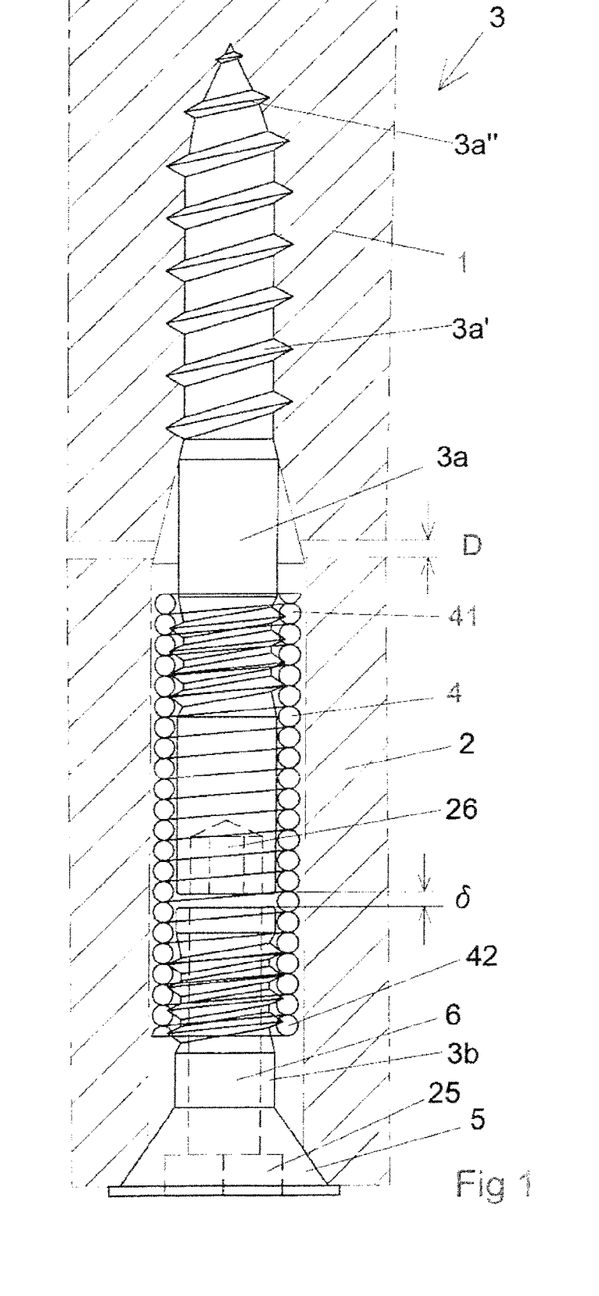
FIG. 1 shows an assembly of an arrangement according to a first embodiment of the invention.

FIG. 1 shows a first construction 1 to which a second construction 2 is attached by means of a resilient attachment arrangement 3. In the shown figure the first construction 1 is formed as a fixed construction, while the second construction is formed as a hanging construction. Other types of fixed first constructions, like walls and floors, may also be referred to in the following.

Hence, the two constructions 1, 2 shall be connected to each other by means of the arrangement 3 in such a way that vibrations, sound and heat transmission are minimized between the constructions. One example is to connect and hold a second ceiling construction, such as a side related and/or a subordinated construction, to a first beam construction, such as a fixed or bearing construction by using this arrangement.

The attachment arrangement 3 comprises a first partial portion 3a interactable with the first construction 1 and a second partial portion 3b interactable with the second construction 2. The first partial portion 3a and the second partial portion 3b are connected with each other in an axial direction by an action means 4 which in one end 41 is connected to the first partial portion 3a and in the other end 42 connected to the second partial portion 3b.

The first partial portion 3a is formed of a rod shaped organ which is provided with an external thread in the connection area to the action means 4 as is shown in the figure or provided with an even pressure surface.

The second partial portion 3b is formed with a construction holding head 5 provided with an axial through hole 6. The head 5 and the hole 6 are provided with an internal edge shaped twist grip 25, for example shaped as a socket head cap grip or with other geometries.

Correspondingly the end of first partial portion 3a, which is facing the end of the second partial portion 3b, is provided with an internal edge shaped key grip 26, for example shaped as a socket head cap grip. This key grip could also be an external edged tap.

As appears in the figure, the two opposing ends of the partial portions are separated from each other by the distance δ when the arrangement 3 is mounted with a maximally compressed action means 4.

The action means 4, such as a helix shaped spring unit, is adapted to resiliently hold said second construction 2 at an adapted distance "D" from said first construction 1, where the distance "D" is equal to or of the same order as the distance δ. Theses both distances are chosen with regard to the actual application.

As also appears from the figure, the first partial portion 3a may be provided with a fixing thread 3a' adapted for wood material, where a top 3a" for said first partial portion 3a is formed as a drill bit with a diameter slightly less than the diameter of the first thread 3a'.

Figure 2:
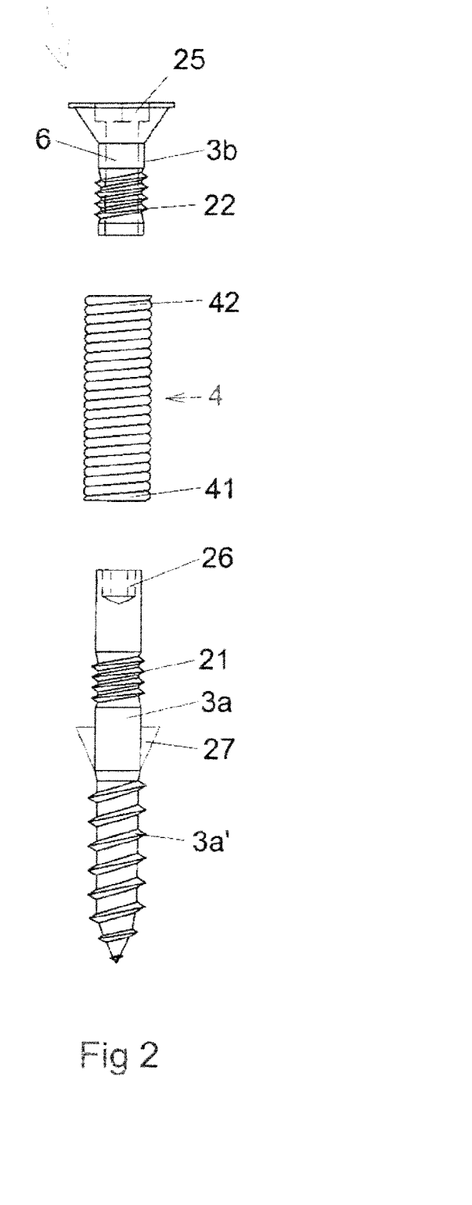
FIG. 2 shows only the arrangement according to FIG. 1 with its parts disassembled.

FIG. 2 shows the disassembled arrangement 3 more clearly with the first partial portion 3a comprising its fixing thread 3a' and its key grip 26, the second partial portion 3b with its twist grip 25 and its through hole 6. The figure also more clearly shows the action means 4 which is arranged to connect the first partial portion 3a with the second partial portion 3b in that one end 41 of the action means 4 can be connected to the first thread 21 on the first partial portion 3a and the other end 42 of the action means 4 can be connected to the second thread 22 on the second partial portion 3b. Also shown in the figure is that the first partial portion of the arrangement may be provided with at least one hole enlarging wing 27. Also two opposite wings as shown in the figure are possible.

Figure 3:
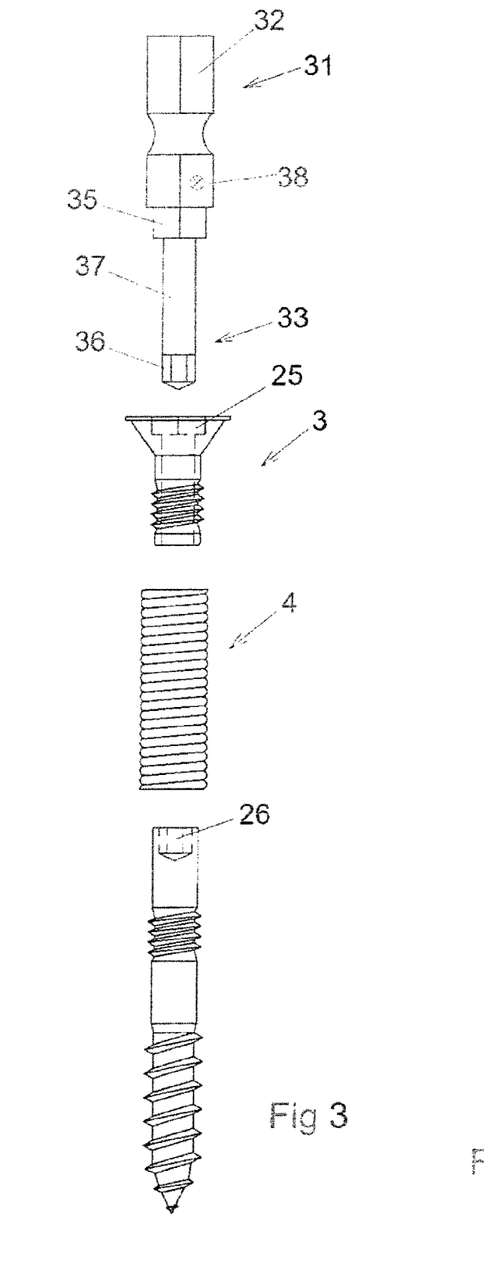
FIG. 3 shows the disassembled modified arrangement according to FIG. 2 together with a first embodiment of an adapted tool.

FIG. 3 shows the arrangement 3 according to FIG. 2, modified by not showing the wings, together with a tool 31 for being able to handle the arrangement 3. The tool 31 is provided with a torque connection end 32 shaped with even edge surfaces, for example suitable for a quarter inch socket, a twist grip connection 35 axially separated from said edge surfaces and an arrangement connection end 33 provided with a key grip connection 36 having even edge surfaces, for example shaped as a hexagon tap. It is of course possible to use other geometrical shapes of said connections. Further, the tool is provided with a grip distance 37 which axially separates the connections 35, 36 from each other. The grip distance 37 has a length which corresponds to the distance between the twist grip 25 of the arrangement 3 and its key grip 26 when the arrangement is put together and the action means 4 is in its rest position. As appears from the embodiment according to the figure, the rest position will be assumed when the action means 4 is completely compressed. Also the tool may be provided with a lock screw 38 allowing a movable grip distance 37 to be fixed in a suitable location. The dimensions of the parts of the tool may also be chosen to allow the action means to be slightly compressed during assembling.

Figure 4:
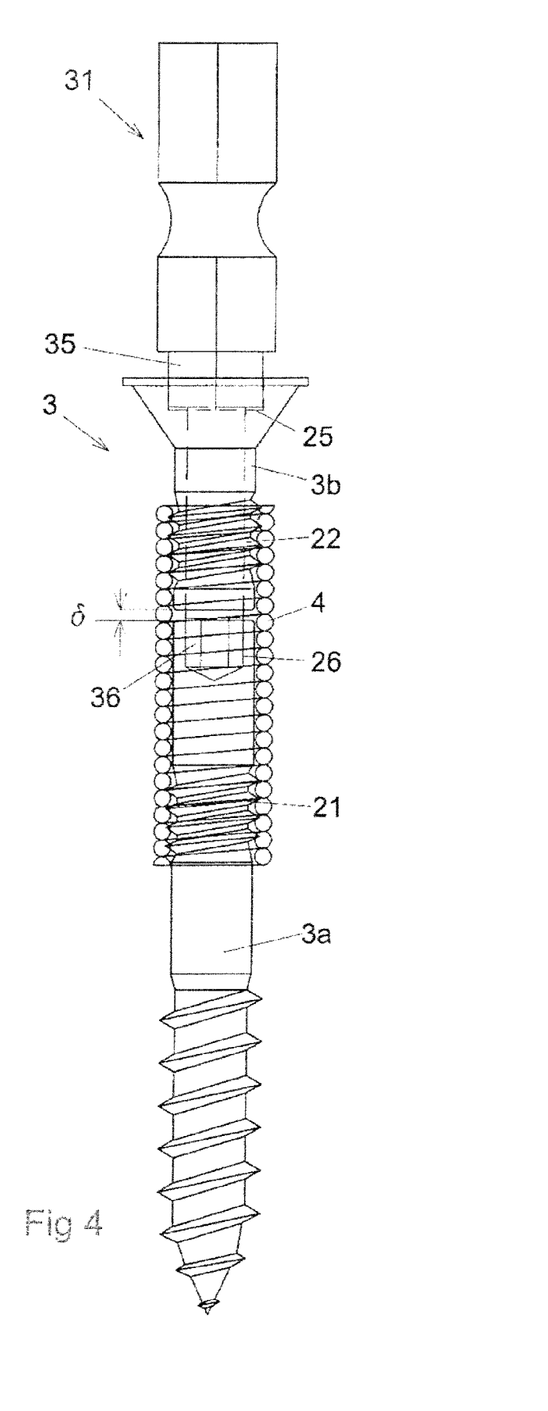
FIG. 4 shows the arrangement according to FIG. 3 joined together with the tool inserted into an active position.

FIG. 4 shows the arrangement 3 assembled with the tool 31 inserted wherein the twist grip connection 35 of the tool seizes the twist grip 25 of the arrangement 3 and wherein the key grip connection 36 of the tool at the same time seizes the key grip 26 of the arrangement 3. The figure also shows that the arrangement 3 in its rest position has a gap δ between the ends of its two partial portions 3a, 3b. As has already been shown in FIG. 1, the action means 4 is connected to the first thread 21 of the first partial portion 3a of the arrangement 3 as well as to the second thread 22 of the second partial portion 3b of the arrangement 3.

Figure 5:
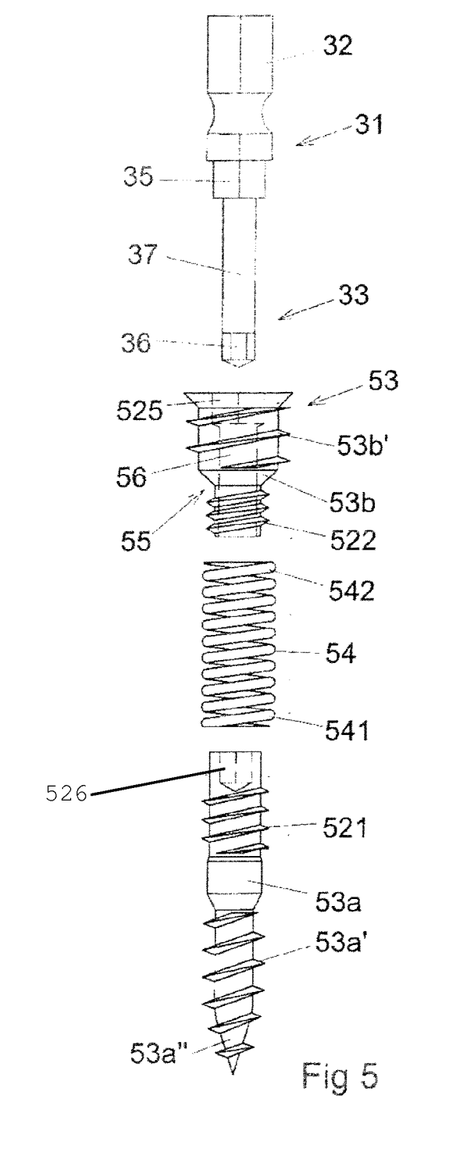
FIG. 5 shows a disassembled arrangement according to a second embodiment of the invention with a second embodiment of an adapted tool.

FIG. 5 shows the arrangement 53 according to a second embodiment where a similar tool 31 to the one shown in FIG. 3 also is shown. This tool 31 is also provided with a torque connection end 32 shaped with even edge surfaces, for example suitable for a quarter inch socket, a twist grip connection 35 axially separated from said edge surfaces and an arrangement connection end 33 provided with a key grip connection 36 with even edge surfaces, for example shaped as a hexagon tap. The tool is also provided with a grip distance 37 which axially separates the connections 35, 36 from each other. The arrangement 53 according to the shown second embodiment is provided with a first partial portion 53a and a second partial portion 53b. The first partial portion 53a is shaped with a first fixing thread 53a' adapted for wood material where a top 53a" of said partial portion 53a is adapted as a drill bit. The first partial portion may also be provided with a wing for enlarging the hole and thus allowing further movement of the action means. The first partial portion is further provided with a first thread 521 with a diameter in excess of the diameter of the fixing thread 53a'. The first partial portion is also provided with a key grip 526 which in the shown embodiment is executed as an internal socket head cap grip. Also external key grips are possible within the scope of protection wherein the end of the tool has the shape of a socket. An action means 54 is connected with one of its ends 541 to this first thread 521. The action means 54 is connected with its other end 542 to a second thread 522 located at an end of the second partial portion 53b. The second partial portion is furthermore provided with a second fixing thread 53b' which preferably is adapted for gypsum boards or wood material and adapted to interact with the second construction either directly or by a pre-fabricated hole formed in the second construction. This second fixing thread 53b' has a larger diameter than both the one for the first fixing thread 53a' and the diameter of the action means 54. Also the second partial portion 53b has a larger diameter than the first partial portion 53a. By means of this design of said second partial portion 53b there is a space 55 adapted to be able to house the action means 54. As has been indicated earlier, this space may be created by means of a wing arranged on the first partial portion. The threads, i.e. the fixing threads, the first thread and the second thread are all orientated with the screw pitch in the same direction. Similar to what has been shown and described in association to the first embodiment of the arrangement, the second partial portion 53b is provided with a twist grip 525 and a centrally through hole 56 so that the arrangement can be screwed on by the tool 31 in accordance with what has been described before. As mentioned earlier, it is possible to attach the action means to the partial portions with other means instead of screws, within the scope of the invention.

The action means 54 is in its resting position, i.e. in a non-stress state, as shown in FIG. 5, shaped as a cylindrical helical spring which may act as a tension spring and/or as a compression spring.

Figure 6:
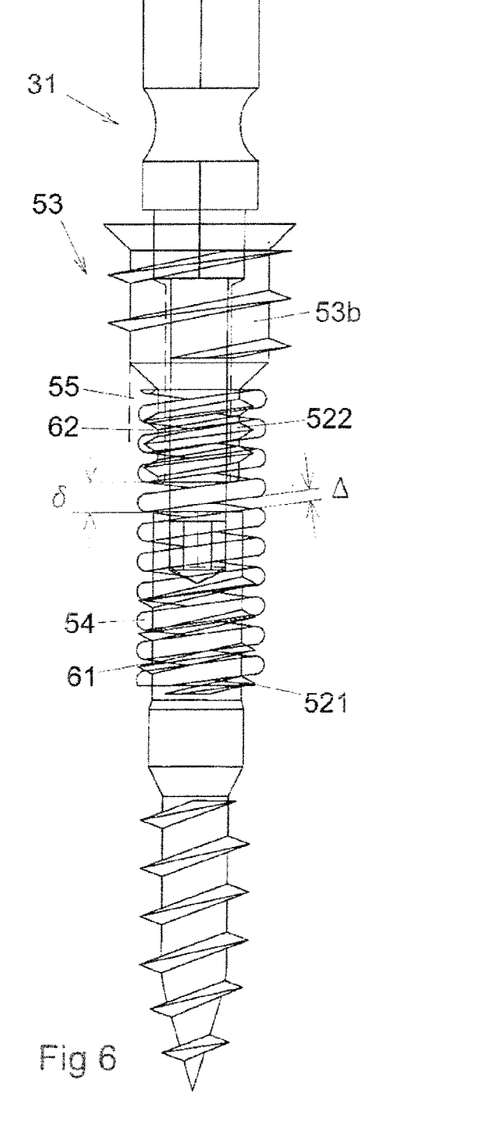
FIG. 6 shows the arrangement according to FIG. 5 joined together with the toll inserted into an active position.

FIG. 6 shows the arrangement 53 in an assembled rest position where the tool 31 is inserted through the second partial portion 53b and wherein both of the partial portions may be twisted at the same time. Furthermore, the distance between the two partial portions may be adjusted by the tool in its design. The distance between the two ends, facing each other, of the partial portions is the distance δ when the action means 54 is in an unloaded state. The distance between each pitch winding is marked with Δ when the action means 54 is in an unloaded state. The figure also shows that the action means 54 is contained within the space 55 which has been created by the larger diameter of the second partial portion 53b which in the figure is indicated with a dotted line. The figure also shows that the action means 54 with its helix shape is connecting to the slots 61, 62 which are created between the pitches of the first thread 521 and between the pitches of the second thread 522.

Figure 7:
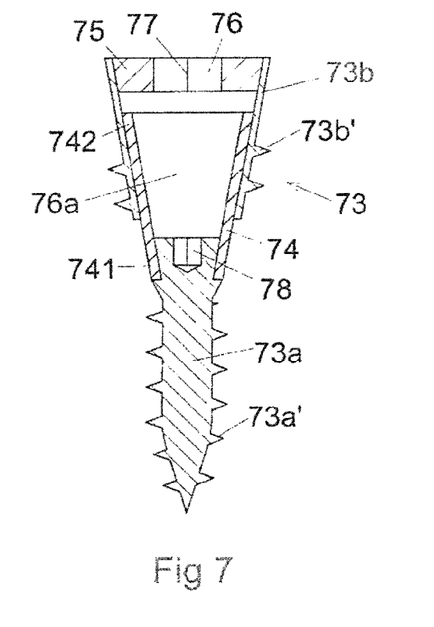
FIG. 7 shows an assembled arrangement according to a third embodiment of the invention.

FIG. 7 shows an assembled arrangement 73 according to a third embodiment of the invention. This embodiment comprises a first partial portion 73a and a second partial portion 73b. The partial portions 73a, 73b are connected to each other only by an action means 74 formed as an elastical conical casing, whose narrow end 741 is externally connected to the end of the first partial portion 73a. The opposite end 742 of the action means 74 is internally connected to the inside of the second partial portion 73b. These connections are preferably shaped as glue joints. In accordance with what has been shown before one end of the first partial portion is provided with a key grip 78 located at the end of the first partial portion 73a facing the second partial portion 73b. Further, the first partial portion 73a is provided with a first fixing means 73a' which has the shape of a thread for fastening to the first construction. The second partial portion is provided with a through hole 76 which extends through a cover 75 of the second partial portion and up to one end of the first partial portion 73a partly in the shape of a hole space 76a. The partial portion is connected to the hole 76 which is provided with twist grip 77 pivotally orientated or orientable for cooperation with the key grip 78 of the first partial portion 73a. The outside of the second partial portion 73b is provided with a second fixing means 73b' which has the shape of a thread so that the partial portion can be screwed into the second construction which for example is made of a porous material.

The assembly of the arrangement 73 according to FIG. 7 is done by first connecting the action means 74 to the first partial portion 73a wherein both of these parts are inserted into and glued to the inside of the conical second partial portion 73b. Thereafter the cover 75 is connected to the widest end of the second partial portion be means of a soldered joint. At the connection of the cover its twist grip 77 is orientated towards the key grip 78.

Figure 8:
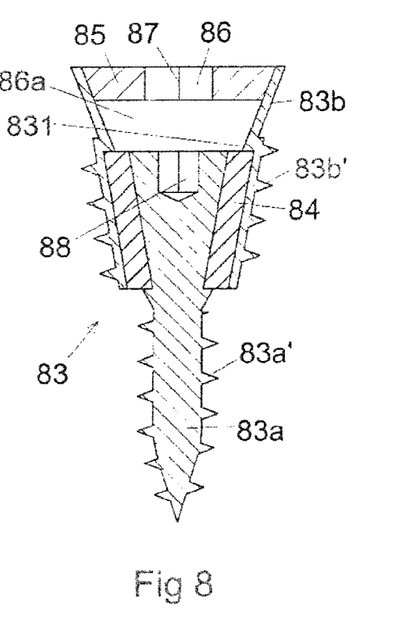
FIG. 8 shows an assembled arrangement according to a fourth embodiment of the invention.

FIG. 8 shows an assembled arrangement 83 according to a fourth embodiment of the invention. In accordance with what has been shown before also this embodiment comprises a first partial portion 83a and a second partial portion 83b. The partial portions 83a, 83b are connected to each other only by an action means 84 also shaped as an elastical conical casing externally connected to the likewise conically shaped end of the first partial portion 83 a. The action means 84 is further internally connected to the inside of the second partial portion 83b. Preferably, these connections are designed as glue joints but as also appears in the figure the action means 84 is also held to the second partial portion by a radially directed locking edge 831. In accordance with what has been shown before one end of the first partial portion is provided with a key grip 88 located in the end of the first partial portion 83 a facing towards the second partial portion 83b and its widest end. Further the first partial portion 83a is provided with a first fixing means 83a' which has the shape of a thread for fastening to the first construction. The second partial portion 83b is provided with a through hole 86 which extends through a cover 85 of the second partial portion 83b and up to one end of the first partial portion 83a, partly in the shape of a hole space 86a. The partial portion is connected to the hole 86 which is provided with a twist grip 87, pivotally orientated or orientable for cooperation with the key grip 88 of the first partial portion 83 a. The outside of the second partial portion 83b is provided with a second fixing means 83b' which has the shape of a thread, so that the partial portion can be screwed into the second construction which for example is made of a porous material.

The assembly of the arrangement 83 according to FIG. 8 is done by first connecting the action means 84 to the first partial portion 83a wherein both these parts are inserted into the conical second partial portion 83b and are snapped by the locking edge 831. The action means may also be glued to the inside of the second partial portion as has been described before. Thereafter, the cover 85 is connected to the widest end of the second partial portion by means of a soldered joint. At the connection of the cover its twist grip 87 is orientated towards the key grip 88.

In both of the embodiments shown in FIGS. 7 and 8 the first partial portions are provided with a radial shoulder, against which the action means bears in order to partly transmit axial forces between the partial portion and the action means. In the embodiments the second partial portions 73b, 83b have a conical shape.

Figure 9:
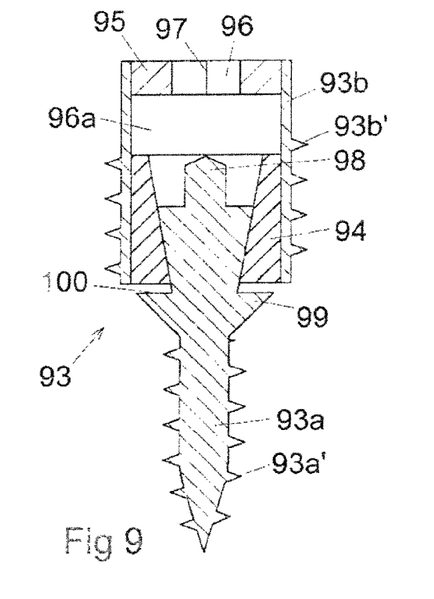
FIG. 9 shows an assembled arrangement according to a fifth embodiment of the invention.

FIG. 9 shows an assembled arrangement according to a fifth embodiment of the invention. In accordance with what has been shown in previous embodiments the arrangement 93 is adapted to be fastened to a first construction and in a fastened position be able to hold a second construction. The arrangement has an axial longitudinal extension and has a first partial portion 93a and a second partial portion 93b. The two partial portions 93a, 93b are connected to each other only by an action means 94 which for example may consist of a resilient element. The arrangement according to this embodiment also aims at holding said second construction at an adapted distance from said first construction. The second partial portion 93b is provided with a through hole 96 which extends through a cover 95 in the second partial portion 93b and up to one end of the first partial portion 93a, partly in the shape of a hole space 96a. The second partial portion is in connection to the hole 96 provided with a twist grip 97 pivotally orientated or orientable for cooperation with a key grip 98 arranged in said first partial portion 93a and located in the end of said first partial portion 93a facing towards said second partial portion 93b. As is shown in the figure, this key grip 98 is shaped as a tap in contrast to previously shown embodiments where the corresponding key grip was shaped as a socket. Further the first partial portion 93a is provided with a first fixing means 93a' which has the shape of a thread, so that the partial portion can be screwed into the second construction which for example is made of a porous material. The action means 94 is according to the embodiment shaped as a cylindrical bushing provided with a conical center hole which is adapted for connection to the corresponding conical end of the first partial portion 93a. The cylindrical outside of the action means is connected to the inner surface of the second partial portion 93b which is also shaped with a cylindrical outer surface. These connections are made by means of a glue joint or a force fit. The first partial portion is according to this embodiment provided with a protecting means 99 which has the shape of a ring-shaped flange with a plane surface 100 in a radial direction. The protecting means has a corresponding radial extension for protecting the action means while the arrangement is active. The protective means may be replaced or combined with a hole broaching wing according to what has been described in association to FIG. 2 and also is shown in FIG. 1.

The assembly of the arrangement 93 according to FIG. 9 is done by first connecting the action means 94 to the first partial portion 93a wherein both of these parts are inserted into the cylindrical second partial portion 93b and fixed therein for example by means of a glue joint. The action means may also be glued to the inside of the second partial portion as has previously been described. Thereafter the cover 95 will be connected to the end of the second partial portion by means of a soldered joint. At the connection of the cover its twist grip 97 is orientated towards the key grip 98.

Figure 10:
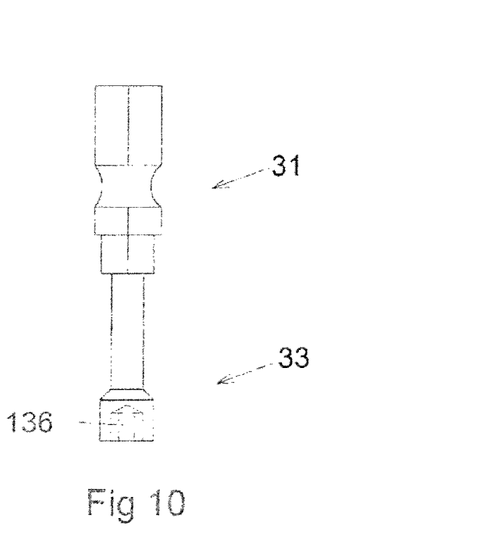
FIG. 10 shows a third embodiment of an adapted tool according to the invention.

FIG. 10 shows a third embodiment of the tool 31 described under reference to FIG. 3 and FIG. 5. This third embodiment is identical to the embodiment shown in FIG. 5 but with the difference that the connecting end of the arrangement 33, instead of a pin, is formed with a key grip connection 136 in the shape of a socket with internal plane surfaces, for example like a hexagon socket. Hence, this tool is adapted for fixation and adjustment of an arrangement where the first partial portion is provided with a key grip in the form of a gripping tap, e.g. according to FIG. 9.

Within the scope of the invention the key grip of the first partial portion may in all embodiments be formed either as a tap or as a socket and may cooperate with a corresponding tool according to FIG. 5 or FIG. 10.

The embodiment according to FIGS. 3, 4, 5 and 6 may also be provided with wings corresponding to the ones shown in FIGS. 1 and 2.

Said action means is shaped as a helical spring with a radius connected to a radius of a groove of the thread of said partial portions.

Said action means should be adjusted with a pitch which is connected to a chosen thread pitch of said partial portions.

The helix adjusted, thin and short mechanical extension of the action means over the gap between the two partial portions consists of the only mechanical sound and/or heat bridge.

The mechanical sound and/or heat bridge which is created by the arrangement, may further reduce sound and heat transmission by creating the action means of a sound, vibration and heat damping material.

Said first partial portion and said second partial portion are orientated in each others extension and the action means is adapted to cooperate with said ends of each partial portion facing each other, in relation to said extension.

The action means may then comprise a spring unit dimensioned for traction force or a spring unit dimensioned for compressive force.

The action means is dimensioned to show a suitable spring constant or "K"-value.

The present invention demands a choice of spring constant "K" (N/m) for its sound reducing function. Such a spring constant will depend on the chosen frequency (f) of the sound wave which will be reduced, the number of connection points (n), the mass (m) which the spring shall carry according to the formula $$n \times K = (f \times 2\pi)^2 \times m$$

which when the frequency (f) is 50 Hz, the number of connection points (n)=1 and the mass is approximately 9 kg/m² gives a "K"-value of $0.8 \times 10^6$ (N/m), at m=18 kg/m² a "K"-value of $1.6 \times 10^6$ (N/m).

At n=7, m=9 the "K"-value becomes $0.13 \times 10^6$ (N/m).

Thus, within the scope of the invention the "K"-value is between $0.01 \times 10^4$ and $10.0 \times 10^8$ (N/m).

The invention claimed is:

1. An attachment arrangement for connection to a first construction and in such a connected state being able to hold a second construction, the attachment arrangement comprising:
    a first partial portion interactable with the first construction; and
    a second partial portion interactable with the second construction;
    wherein the first and the second partial portions are connected to each other only by a helical spring to allow the second construction to be held at an adapted distance (D) from the first construction;
    wherein the second partial portion is provided with an axial through hole that defines a twist grip;
    wherein the first partial portion has an end with a key grip facing towards the second partial portion;
    wherein the twist grip is pivotally orientated or orientable for cooperation with the key grip; and
    wherein the axial through hole of the second partial portion and the helical spring are arranged to receive a tool therethrough, thereby allowing the tool to engage with the twist grip of the second partial portion and the key grip of the first partial portion at the same time.

2. The attachment arrangement according to claim 1, wherein the first partial portion is provided with contact surfaces that bear against the helical spring so that the first partial portion is resiliently movable in a longitudinal or a lateral direction relative to the second partial portion.

3. The attachment arrangement according to claim 1, wherein the first partial portion and the second partial portion are connected in series with each other by two ends of the helical spring, the two ends being adapted to connect the first and the second partial portions with each other.

4. The attachment arrangement according to claim 1, wherein the first partial portion is provided with a first thread that is connected to one end of the helical spring; and wherein the second partial portion is provided with a second thread that is connected to another end of the helical spring.

5. The attachment arrangement according to claim 1, wherein the helical spring has a radius that is connected to a radius of the first and the second partial portions.

6. The attachment arrangement according to claim 1, wherein the second partial portion is axially displaceable in relation to the first partial portion; and wherein, when the second partial portion is in an inserted displacement state, via the helical spring, the twist grip and the key grip are accessible, so that a tool can turn both the first partial portion and the second partial portion at the same time.

7. The attachment arrangement according to claim 4, wherein the first partial portion is provided with a first fixing thread for fixing to the first construction.

8. The attachment arrangement according to claim 1, wherein the second partial portion is provided with a second fixing thread for fixing to the second construction.

9. The attachment arrangement according to claim 7, wherein the first thread and the first fixing thread are axially displaced in relation to each other along the first partial portion.

10. The attachment arrangement according to claim 9, wherein the first fixing thread consists of a thread suitable for wood.

11. The attachment arrangement according to claim 1, wherein the first partial portion and the second partial portion are orientated in an extension of each other; and wherein the helical spring is adapted to cooperate with end portions facing each other of the first and the second partial portions in relation to the extension.

12. The attachment arrangement according to claim 1, wherein the helical spring holds the first and the second partial portions separated by a distance $\delta$ in a rest position.

13. The attachment arrangement according to claim 1, wherein the second partial portion is conically shaped.

14. The attachment arrangement according to claim 1, wherein the first partial portion is provided with a hole enlarging wing or a corbelling protecting the helical spring.

15. A tool comprising:

a torque connecting end and an arrangement connecting end for adjusting or mounting of an arrangement according to claim 1;

wherein the arrangement connecting end of the tool is provided with a twist grip connection shaped for engagement with a twist grip, and a key grip connection shaped for engagement with a key grip; and wherein the twist grip connection and the key grip connection are located at a distance from each other by means of a grip distance.

16. The tool according to claim 15, wherein the length of the grip distance corresponds to a length which means that the first and the second partial portions in the attachment arrangement may be rotated at the same time when the helical spring in the attachment arrangement is close to or in its rest position.

17. The tool according to claim 15, wherein the grip distance is axially displaced and locked in the tool in order to change the distance between the twist grip connection and the key grip connection.

18. An attachment arrangement for connection to a first construction and in such a connected state being able to hold a second construction, the attachment arrangement comprising:

a first partial portion interactable with the first construction, the first partial portion including a first external thread; and a second partial portion interactable with the second construction, the second partial portion including a second external thread;

wherein the first and the second partial portions are connected to each other only by a helical spring to allow the second construction to be held at an adapted distance (D) from the first construction;

wherein a first end of the helical spring engages with the first external thread of the first partial portion, and a second end of the helical spring engages with the second external thread of the second partial portion;

wherein the second partial portion is provided with an axial through hole that defines a twist grip;

wherein the first partial portion has an end with a key grip facing towards the second partial portion;

wherein the axial through hole of the second partial portion opens into an interior of the helical spring.

* * * * *